United States Patent
Van Heugten et al.

(10) Patent No.: US 6,642,305 B2
(45) Date of Patent: Nov. 4, 2003

(54) THIXOTROPIC AMINO FORMALDEHYDE RESIN

(75) Inventors: Richard Gerardus Johannes Maria Van Heugten, Bergen op Zoom (NL); Johannes Bernardus Van Der Sanden, Nispen (NL); Cornelis Adrianus Maria Vijverberg, Halsteren (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/884,195

(22) Filed: Jun. 19, 2001

(65) Prior Publication Data

US 2002/0082324 A1 Jun. 27, 2002

Related U.S. Application Data

(63) Continuation of application No. PCT/EP99/10180, filed on Dec. 20, 1999.

(30) Foreign Application Priority Data

Dec. 22, 1998 (EP) ............................................. 98204363

(51) Int. Cl.⁷ .................................................. C08K 5/21
(52) U.S. Cl. ...................... 524/728; 525/520; 525/903; 524/212
(58) Field of Search ................................ 525/520, 903; 524/728, 212

(56) References Cited

U.S. PATENT DOCUMENTS

| | | | |
|---|---|---|---|
| 3,547,848 A | 12/1970 | Marsh et al. ................. | 260/22 |
| 3,893,956 A | 7/1975 | Brandt ......................... | 260/18 |
| 4,383,068 A | 5/1983 | Brandt ......................... | 524/196 |
| 4,851,294 A | 7/1989 | Buter et al. ............... | 428/425.8 |
| 4,882,408 A | 11/1989 | Blum ......................... | 528/49 |
| 5,795,933 A | * 8/1998 | Sharp et al. | |
| 6,111,001 A | * 8/2000 | Barancyk et al. | |

FOREIGN PATENT DOCUMENTS

| | | | |
|---|---|---|---|
| DE | 1 805 693 | 2/1970 | ............ C09D/5/04 |
| DE | 2 359 929 | 6/1974 | ............ C08K/1/48 |
| EP | 198 519 | 10/1986 | ............ C09D/5/04 |
| EP | 300 388 | 1/1989 | ............ C08L/75/04 |
| GB | 1 454 414 | 11/1976 | ............ C08L/67/08 |

OTHER PUBLICATIONS

International Search Report, dated Apr. 27, 2000.

* cited by examiner

Primary Examiner—Rachel Gorr
(74) Attorney, Agent, or Firm—Lainie E. Parker; Michelle J. Burke

(57) ABSTRACT

A thixotropic amino formaldehyde resin with a urea-functional compound, obtainable by adding a polyisocyanate-functional compound to a monoamine-functional compound or a monoisocyanate-functional compound to a polyamine-functional compound in the presence of the amino formaldehyde resin and reacting the amine and isocyanate-functional compounds to form the urea-functional compound entangled to the resin. The thixotropic amino formaldehyde resin can be used in the formulation of coating or adhesive compositions.

6 Claims, No Drawings

THIXOTROPIC AMINO FORMALDEHYDE RESIN

This application is a continuation of PCT/EP99/10180, filed Dec. 20, 1999, which claims priority of European Patent Application No. 98204363.0, filed Dec. 22, 1998.

FIELD OF THE INVENTION

The present invention relates to a thixotropic amino formaldehyde resin with a urea-functional compound and the use thereof in coating formulations.

BACKGROUND OF THE INVENTION

Thixotropic agents or sag control agents are essential elements of nowadays-produced coating compositions. They not only provide a stable mixture of the several components in a coating composition, but also enable the application of the coating, even in thick layers on vertically placed objects, without the occurrence of sags in the cured coating.

It is well known in the art to prepare a thixotropic binder composition, e.g., by mixing a binder and a sag control agent. For example, in EP 0,198,519 a diurea compound is used as a sag control agent in a thixotropic coating composition. The preparation of the sag control agent may be carried out in the presence of a binder. In GB 1,454,414 a thixotropizing urea adduct is prepared in situ in the presence of the binder. In this publication it is further said that urea adducts prepared in situ in the presence of an amino formaldehyde resin, readily show incompatibility with the resin. It is concluded that it is more effective to carry out in situ formation of the urea adduct in the plasticizing binder.

In GB 1,454,414 a general method is disclosed for the preparation of a thixotropic amino formaldehyde resin-containing coating composition, viz. in situ formation of a urea adduct in the binder component and then mixing the thixotroped binder with the amino formaldehyde resin. Urea adducts are obtained by reacting an amine-functional compound and an isocyanate-functional compound. Substantially the same method is used in EP 0,198,519 wherein the binder is selected from ester diols, polyesters, polyurethanes, alkyd resins, acrylate, and methacrylate resins. In DE 1,805,693 the formation of urea-functional compounds is described without the presence of any binder. The thus obtained thixotropic coating compositions based upon a thixotropic binder and an amino formaldehyde resin are well known and used in the art.

However, in practice a large number of thixotropic coating compositions are used containing different binders. As a consequence the different binders should all be modified with a thixotropic agent. Therefore, the use of a universal thixotropic amino formaldehyde resin would give a substantial advantage in the preparation of coating compositions.

Moreover, since in situ formation of a urea adduct in the binder component limits the functionality of the binder component, e.g., the binder component should not be reactive towards the amine-functional compound or the isocyanate-functional compound which are used for the in situ formation of the urea adduct, there is a need for a thixotropic coating composition based upon a thixotropic amino formaldehyde resin.

SUMMARY OF THE INVENTION

Surprisingly, it was found that a thixotropic amino formaldehyde resin with a urea-functional compound is obtained by adding a polyisocyanate-functional compound to a monoamine-functional compound or a monoisocyanate-functional compound to a polyamine-functional compound in the presence of the amino formaldehyde resin and reacting the amine and isocyanate-functional compounds to form the urea-functional compound entangled as solid material in the resin. The thus obtained urea-adduct acts as a rheology modifier and a thixotropic effect is developed in the amino formaldehyde resin.

DETAILED DESCRIPTION OF THE INVENTION

It was found that by the in-situ preparation of a urea compound from a monoamine and an polyisocyanate-functional compound first the free formaldehyde content is decreased and that after that, if the free formaldehyde content no longer decreases, a thixotropic effect is developed in the amino formaldehyde resin.

It was found that particularly good results were obtained when the amount of the isocyanate-functional compound is at least 4 times the amount of free formaldehyde that is present in the amino formaldehyde resin.

The process does not depend on the type of amino formaldehyde resin that is used. Resins with a relatively high or low free formaldehyde content can be used. However, preferably amino formaldehyde resins are used with a relatively low free formaldehyde content. In general, these amino formaldehyde resins can be schematically indicated by the following chemical structure:

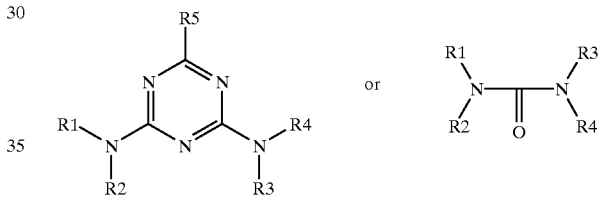

wherein each of $R_1$, $R_2$, $R_3$, and $R_4$ independently have the meaning of H, or $CHR_6$—O—$R_7$, wherein the $R_6$ and $R_7$ groups independently have the meaning of H or alkyl. $R_5$ has the meaning phenyl or $NR_8R_9$, wherein $R_8$ and $R_9$ have the same meaning as $R_1$, $R_2$, $R_3$, or $R_4$.

In general, amino formaldehyde resins contain molecules of the above general formula and oligomers thereof.

In the context of this invention, a monoamine-functional compound is an amine compound, which contains only one isocyanate-reactive amino group.

Suitable amine-functional compounds include primary amines, such as benzylamine, methylamine, ethylamine, n-propylamine, sec-propylamine, n-butylamine, sec-butylamine, tert-butylamine, n-pentylamine, α-methylbutylamine, α-ethylpropylamine, β-ethylbutylamine, hexylamine, octylamine, decylamine, stearylamine, cyclohexylamine, aniline, and mixtures thereof.

The primary amines generally contain not more than 55 carbon atoms, preferably 1–24, and more particularly 1–12 carbon atoms. Amines containing one primary amino group and one or more ether and/or hydroxyl groups are also applicable; for example, ethanolamine, 3-(dimethylamino) propylamine, 6-aminohexanol, p-methoxybenzylamine, methoxypropylamine, ethoxypropylamine, 3,4-dimethoxyphenyl-ethylamine, 2,5-dimethoxyaniline, furfurylamine, tetrahydrofurfurylamine and bis(3-aminopropyl)-polytetrahydrofuran having a molecular weight of about 750. Preferred monoamines are selected from hexylamine, methoxypropylamine, ethoxypropylamine, benzylamine, or mixtures thereof.

In the context of this invention, a polyamine-functional compound is an amine compound, which contains at least two isocyanate-reactive amino groups. Suitable polyamine compounds include primary polyamines as, e.g., 1,6-hexamethylene diamine, neopentyldiamine, 2-methyl-1,5-pentamethylene diamine, ethylene diamine, diethylene triamine, triethylene tetramine, tetraethylene pentamine, pentaethylene hexamine, hexaethylene heptamine, 2-butyl-2-ethyl-1,5-pentane-diamine, diamines obtained from dimeric fatty acids preferably having at least 36 carbon atoms, isophorone diamine, meta-xylene diamine, xylylene diamine, and mixtures thereof.

The primary polyamines generally contain not more than 55 carbon atoms, preferably 1–24, and more particularly 1–12 carbon atoms. Amines containing at least two amino groups and one or more ether and/or hydroxyl groups are also applicable. Preferred polyamines are selected from 1,6-hexamethylene diamine, isophorone diamine, toluene diamine, or mixtures thereof.

In the context of this invention, monoisocyanate-functional compounds are isocyanates that contain only one amine-reactive isocyanate group.

Examples of monoisocyanate-functional compounds are those represented by the formula R—NCO wherein R represents a monovalent aliphatic hydrocarbon group having 2 to 18 carbon atoms, a monovalent cycloaliphatic hydrocarbon group having 5 to 15 carbon atoms, a monovalent araliphatic hydrocarbon group having 7 to 15 carbon atoms, or a monovalent aromatic hydrocarbon group having 6 to 15 carbon atoms. Examples of organic monoisocyanates which are particularly suitable include methyl isocyanate, butyl isocyanate, hexyl isocyanate, benzyl isocyanate, phenyl isocyanate, naphthalene isocyanate, biphenyl isocyanate, methoxypropyl isocyanate, and ethoxypropyl isocyanate, or mixtures thereof. Preferred monoisocyanate compounds are selected from hexyl isocyanate, methoxypropyl isocyanate, ethoxypropyl isocyanate, benzyl isocyanate, or mixtures thereof.

In the context of this invention, polyisocyanate-functional compounds are isocyanates, which contain at least two amine-reactive isocyanate groups.

Suitable polyisocyanate-functional compounds include aliphatic, cycloaliphatic, and aromatic isocyanates. The polyisocyanate-functional compound can be an aromatic, aliphatic, cycloaliphatic and/or araliphatic isocyanate-functional compound. The polyisocyanate-functional compound can be an isocyanurate, uretdione, biuret, allophanate, an adduct of a polyol and a diisocyanate, NCO prepolymers, or mixtures thereof.

Examples of suitable isocyanates to be used as the polyisocyanate-functional compound or as starting materials for preparing an polyisocyanate-functional compound comprising an isocyanurate, biuret or uretdione structure include organic polyisocyanates represented by the formula

wherein k is 2 or higher and R represents an organic group.

Examples of diisocyanate-functional compounds are those represented by the above formula wherein k is 2 and R represents a divalent aliphatic hydrocarbon group having 2 to 18 carbon atoms, a divalent cycloaliphatic hydrocarbon group having 5 to 15 carbon atoms, a divalent araliphatic hydrocarbon group having 7 to 15 carbon atoms, or a divalent aromatic hydrocarbon group having 6 to 15 carbon atoms. Examples of the organic diisocyanates which are particularly suitable include ethylene diisocyanate, 1,3-propylene diisocyanate 1,4-tetramethylene diisocyanate, 1,6-hexamethylene diisocyanate, 2,2,4-trimethyl-1,6-hexamethylene diisocyanate, 2-methyl-1,5-diisocyanate pentane, 2-ethyl-1,4-diisocyanate butane, 1,12-dodecamethylene diisocyanate, cyclohexane-1,3- and -1,4-diisocyanate, 1-iso-cyanato-2-isocyanatomethyl cyclopentane, isophorone diisocyanate, toluene diisocyanate, bis-(4-isocyanatocyclohexyl)-methane, 1,3- and 1,4-bis-(isocyanatomethyl)-cyclohexane, bis-(4-isocyanato-3-methyl-cyclohexyl)-methane, 1-methyl-2,4-diisocyanato cyclohexane, (5-isocyanato)-1-(isocyanatomethyl)-1,3,3-trimethylcyclohexane, xylene diisocyanate, 1-methyl-2,4-diisocyanato benzene, α,α,α',α'-tetramethyl-1,3- and -1,4-xylylene diisocyanate, 2,4- and 2,6-hexahydro-toluylene diisocyanate, 1,3- and 1,4-phenylene diisocyanate, 2,4- and 2,6-toluylene diisocyanate, 2,4- and 4,4'-diphenylmethane diisocyanate, 1,5-diisocyanato naphthalene, norbornane diisocyanate, and mixtures thereof. Aliphatic polyisocyanates containing 3 or more isocyanate groups such as 4-isocyanatomethyl-1,8-octane diisocyanate and aromatic polyisocyanate containing three or more isocyanate groups such as 4,4',4"-triphenylmethane triisocyanate, 1,3,5-triisocyanate benzene, polyphenyl polymethylene polyisocyanates obtained by phosgenating aniline/formaldehyde condensates, and mixtures thereof may also be used.

Also the isocyanurate trimer of isophorone diisocyanate, biuret of hexamethylene diisocyanate, the isocyanurate of hexamethylene diisocyanate, the uretdion of isophorone diisocyanate, the uretdion of hexamethylene diisocyanate, the allophanate of hexamethylene diisocyanate, and mixtures thereof can be used. Isocyanate-functional compounds comprising an allophanate structure are prepared by the reaction of the above-mentioned organic polyisocyanates with a mono- or polyalcohol. Preferably, isocyanate-functional compounds comprising an allophanate structure are prepared from 1,6-hexamethylene diisocyanate and/or isophorone diisocyanate reacted with an alcohol, preferably butanol.

Polyisocyanate adducts include the reaction product of 3 moles of m-tetramethylxylene diisocyanate with 1 mole of trimethylol propane, the reaction product of 3 moles of toluene diisocyanate with 1 mole of trimethylol propane. Preferred polyisocyanate compounds are selected from 1,6-hexamethylene diisocyanate, isophorone diisocyanate, toluene diisocyanate, isocyanurate of hexamethylene diisocyanate, or mixtures thereof.

The reaction between the monoamine and the polyisocyanate-functional compound or the monoisocyanate and polyamine-functional compound may generally be carried out in any arbitrarily chosen way by combining the reacting compounds, optionally at elevated temperature. It is preferred that the reaction should be carried out in an atmosphere of an inert gas at temperatures in the range of −20° to +80° C. The sequence in which the monoamine and the polyisocyanate-functional compound or the monoisocyanate and polyamine-functional compound are added to the amino formaldehyde resin is not important. As a rule, it is preferred that the isocyanate-functional compound is added to the amine-functional compound that is present in the resin. If so desired, this may be done in several steps. However, if the poly- or monoisocyanate-functional compound is added first, care should be taken that the thus obtained mixture is not stored for too long or at a too high temperature, since a reaction between the amino formaldehyde resin and the poly- or monoisocyanate-functional compound might occur.

Needless to say, the amine and the isocyanate-functional compounds should be thoroughly mixed with the amino formaldehyde resin upon addition, for instance, by using low or high shear mixers (such as rotor-stator mixers, dispensers and the like). Preparation can be performed batchwise as well as in a continuous process. It is also possible to add the amine compound to a portion of the amino formaldehyde resin and to add the isocyanate-functional compound to another portion of the amino formaldehyde resin followed by combining the two amino formaldehyde resin mixtures, optionally with additional amino formaldehyde resin being added.

The reaction between the amine-functional compound and the isocyanate-functional compound is carried out in the amino formaldehyde resin, wherein optionally an inert organic solvent can be present.

If the amine-functional compound and the isocyanate-functional compound are added in stoichiometric amounts, each amine group of the amine-functional compound reacts with an isocyanate group of the isocyanate-functional compound and that no free amine or isocyanate groups are present after completion of the theoretical reaction. However, in order to prevent the presence of small amounts of unreacted amino groups of the amine-functional compound a slight excess of isocyanate-functional compound can be used. Preferably, this excess ranges from 1 to 10%, based on equivalents.

Very good results are obtained by reacting a monoamine with a polyisocyanate if the monoamine is hexylamine, benzylamine, methoxypropylamine, ethoxypropylamine or mixtures thereof, and the polyisocyanate-functional compound is a diisocyanate, in particular 1,6-hexamethylene diisocyanate, isophorone diisocyanate, toluene diisocyanate, the isocyanurate of hexamethylene diisocyanate, or mixtures thereof.

Very good results are obtained by reacting a monoisocyanate with a polyamine if the monoisocyanate is hexyl isocyanate, benzyl isocyanate, methoxypropyl isocyanate, ethoxypropyl isocyanate or mixtures thereof, and the polyamine-functional compound is a diamine, in particular 1,6-hexamethylene diamine, isophorone diamine, toluene diamine, or mixtures thereof.

Since the thixotropic amino formaldehyde resins according to the present invention have a (very) low free formaldehyde content, the resins are pre-eminently suited to be used in the formulation of coating compositions. In coating compositions these resins can be used as cross-linkers, e.g., for high temperature curing coating compositions. One of their advantages over presently used coating formulations comprising an amino formaldehyde resin is the much lower formaldehyde emission during application of the coating.

Depending on the amino formaldehyde resin employed, any conventional compound can be used as binder resin. The thixotropic coating composition may further contain usual adjuvants and additives for instance pigment dispersants, dyes, pigments, solvents and accelerators for the curing reaction.

The thixotropic coating composition may be applied to a substrate in any desired manner, for instance by rolling, spraying, brushing, sprinkling, casting, dipping or electrostatic spraying. The thixotropic coating composition may further be cured or baked in the usual way, for instance at ambient temperatures or in an oven at the higher temperatures, for instance in the range of 80° to 250° C., over a period of 2 to 120 minutes.

The invention will be further illustrated with reference to the following examples. Needless to say, these are exemplified embodiments to which the invention is not limited.

Measuring Methods

Determination of the Urea Compound

A well defined weight of the urea modified amino formaldehyde resin is mixed with 100 g of acetone and gently stirred until a homogeneous solution is obtained. The solution is carefully filtered over a glass fiber filter that was accurately weighted in advance. Directly after filtration the solid urea material on the filter is washed with 150 ml of acetone. The filter is dried during 45 minutes at 107° C. Directly after drying the filter is weighted again. Then the amount of urea compound is calculated and given as a percentage based on the modified amino formaldehyde resin.

Determination of the Free Formaldehyde Content

The free formaldehyde content of an amino formaldehyde resin can be measured quantitatively by reacting the free formaldehyde in the resin with sodium sulfite, followed by titration with sulfuric acid. In this way the amount of alkaline liberated by the reaction between formaldehyde and sodium sulfite can be determined quantitatively. The free formaldehyde contents mentioned in the text were all determined at 20° C. If the free formaldehyde content is determined at 0° C. (according ISO 9020) lower free formaldehyde levels will be found. A free formaldehyde content of 1 wt. % corresponds to 0.33 meq formaldehyde/g of resin.

EXAMPLE 1

Into a one-liter reaction vessel equipped with an anchor stirrer and two dropping funnels were charged 700 g of Setamine® US-144 BB-60 (a melamine-formaldehyde resin, ex Akzo Nobel) with a free formaldehyde content of 0.37 wt. %. The temperature was brought to 30° C. Then 25.05 g of benzylamine were added and mixed at 200 rpm for 15 minutes. Next the reaction vessel was cooled with ice water and 20.25 g of hexamethylene diisocyanate were added in two minutes at 750 rpm. After the addition, the reaction mixture was stirred for another 30 minutes at 750 rpm.

The obtained white solution contained 3.0% of a diurea compound. The free formaldehyde content was 0.00 wt. %.

EXAMPLE 2

Into a one-liter reaction vessel equipped with a dissolver having a disc with a diameter of 60 mm and two dropping funnels were charged 600 g of Cymel 303 (a melamine-formaldehyde resin ex. Cytec Industries) with a free formaldehyde content of 0.42 wt. %. 33.6 g of isobutanol were added. The mixture was stirred during three minutes at 1700 rpm. 29.27 g of benzylamine were added and mixed at 1700 rpm for 5 minutes. Next 23.66 g of hexamethylene diisocyanate were added in six minutes at 2000 rpm. During the addition of the hexamethylene diisocyanate the stirrer speed was raised to 4400 rpm, the temperature raised to 61° C. After completion of the addition the reaction mixture was stirred for another 10 minutes at 4400 rpm. In this period the temperature raised to 78° C. The solution contained 7.1 wt. % of a diurea compound. The free formaldehyde content was 0.07 wt. %.

EXAMPLE 3

Into a one-liter reaction vessel equipped with an anchor stirrer and two dropping funnels were charged 700 g of Setamine® US-138 BB-70 (a butylated melamine resin, ex Akzo Nobel) with a free formaldehyde content of 1.34 wt. %. The temperature was raised to 30° C. Then 13.0 g of benzylamine were added and mixed at 200 rpm for 15 minutes. Next the reaction vessel was cooled with ice water and 10.5 g of hexamethylene diisocyanate were added during two minutes at 750 rpm. After the addition the reaction mixture was stirred for another 30 minutes at 750 rpm.

A clear solution without solid diurea particles was obtained with a free formaldehyde content of 0.20 wt. %.

What is claimed is:

1. A thixotropic amino formaldehyde resin with a urea-functional compound obtainable by adding a polyisocyanate-functional compound to a monoamine-functional compound in the presence of the amino formaldehyde resin and reacting the amine and isocyanate-functional compounds to form the urea-functional compound entangled as solid material in the resin.

2. The thixotropic amino formaldehyde resin of claim 1, wherein the amount of the urea-functional compound is at least 4 times the amount in wt. % of free formaldehyde that is present in the amino formaldehyde resin.

3. The thixotropic amino formaldehyde resin of claim 1, wherein the monoamine-functional compound is hexylamine, methoxypropylamine, ethoxypropylamine, benzylamine, or mixtures thereof, and the polyisocyanate-functional compound is 1,6-hexamethylene diisocyanate, isophorone diisocyanate, toluene diisocyanate, isocyanurate of hexamethylene diisocyanate, or mixtures thereof.

4. A process for the preparation of a thixotropic amino formaldehyde resin with a urea-functional compound comprising the steps of adding a polyisocyanate-functional compound to a monoamine-functional compound in the presence of the amino formaldehyde resin, and reacting the amine and isocyanate-functional compounds to form the urea-functional compound entangled to the resin.

5. A coating or adhesive composition comprising the thixotropic amino formaldehyde resin of claim 1.

6. A method of cross-linking a high temperature-curing coating composition comprising applying the amino formaldehyde resin of claim 1.

* * * * *